B. V. CORNELIUS.
MANURE WAGON.
APPLICATION FILED JUNE 4, 1915.

1,178,299.

Patented Apr. 4, 1916.

WITNESSES:
Frank C. Palmer
Walton Harrison

INVENTOR
B. V. Cornelius
BY
ATTORNEY

UNITED STATES PATENT OFFICE.

BARNEY VICK CORNELIUS, OF VILLAGE SPRINGS, ALABAMA.

MANURE-WAGON.

1,178,299.  Specification of Letters Patent.  Patented Apr. 4, 1916.

Application filed June 4, 1915. Serial No. 32,091.

*To all whom it may concern:*

Be it known that I, BARNEY V. CORNELIUS, a citizen of the United States, and a resident of Village Springs, in the county of Blount and State of Alabama, have invented a new and useful Manure-Wagon, of which the following is a full, clear, and exact description.

My invention relates to manure wagons and more particularly to devices of this character suitable for distributing manure in the liquid form.

My invention further comprehends certain auxiliary mechanism closely associated with the use of such manure wagons for the purpose of improving the general efficiency of the same.

More particularly stated, I provide a wagon having separate compartments, one for carrying manure, and the other for carrying water, the parts being so arranged that leakage from the manure mingles with the water and may be discharged therewith for purposes of fertilization.

Reference is to be had to the accompanying drawings forming a part of this specification in which like characters of reference indicate like parts in both the views, and in which—

Figure 1:
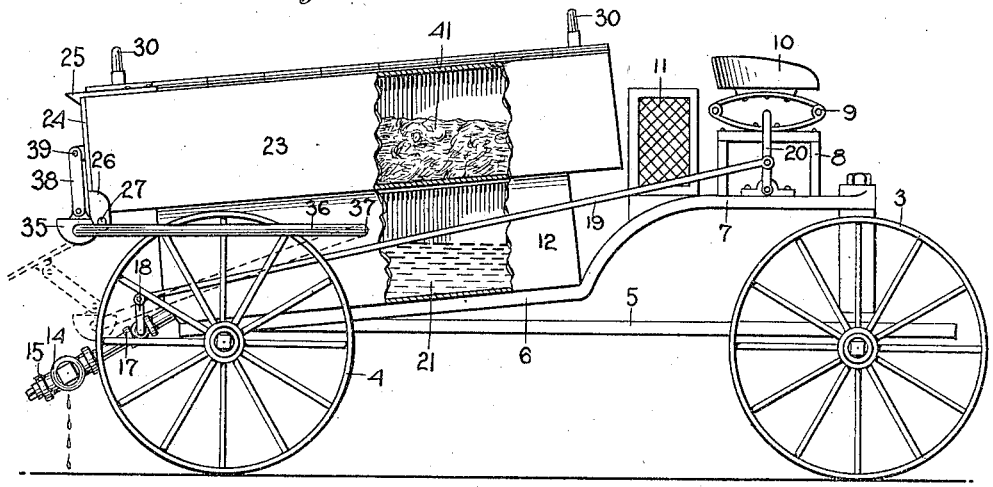
Figure 2:
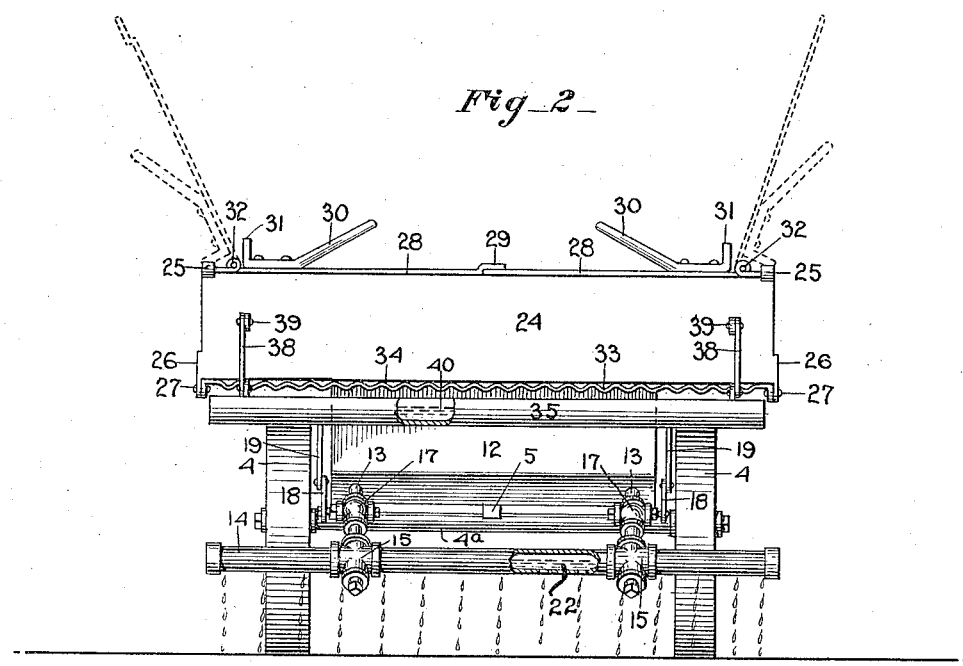

Figure 1 is a side view partly in elevation and partly broken away, showing my manure wagon complete; and Fig. 2 is a rear end elevation of the vehicle, certain parts being broken away.

The vehicle is provided with front wheels 3, rear wheels 4, a coupling pole 5, and a wagon body or platform 6, this member having an elevated portion 7 of sufficient height above the ground to enable the front wheels to be steered or turned under it, thereby giving the wagon considerably leeway or turning movement. Mounted upon the portion 7 is a frame 8 carrying springs 9, the latter supporting the driver's seat 10. A fly trap 11 may be placed directly at the rear of the driver's seat for the purpose of catching flies or other pestiferous insects.

Mounted upon the body portion 6 of the wagon is a tank 12, and extending rearwardly and downwardly from this tank are two pipes 13, the latter being in communication with a distributing pipe 14 which has the general form of a perforated tube and extends practically the full width of the vehicle, as indicated in Fig. 2. This nozzle is provided with openings 16 and is adapted to hold a quantity of liquid 22. This distributing pipe is parallel with the rear axle 4ª and is located a little to the rear of the wheels 4. The distributing pipe 14 is provided with T's 15 to facilitate connection of the pipes 13 therewith. These pipes are provided with valves 17 which have levers 18 whereby they are opened and closed. Connected with the levers 18 are two pitmen 19 of considerable length, the latter being pivotally connected to a pair of hand levers exactly alike, one of which is shown at 20 in Fig. 1. The operator by aid of these hand levers can open and close the valves 17 either simultaneously or at different moments, as desired. The tank 12 contains a liquid 21 which is simply the leakage or drippings from manure and is therefore usually designated as liquid manure.

Located above the tank 6 is a receptacle 23, the rear end of this receptacle being provided with a gate 24 normally held closed by aid of latches 25. This gate is provided with bearings 26, and extending through the bearings are pins 27 whereby the gate 24 is enabled to swing relatively to the receptacle 23, as indicated by dotted lines in Fig. 1. The receptacle 23 is further provided with a pair of doors 28 (see Fig. 2), one of these doors having an edge portion 29 which slightly overlaps the adjacent edge portion of the other of these doors. The doors 28 are provided with handles 30 whereby they may be readily opened and closed. They are further provided with lugs 31 for supporting them in open position, as indicated by dotted lines in Fig. 2. The doors 28 are mounted to swing on hinges 32. The receptacle 23 is provided with a corrugated bottom 33, the corrugations of which extend lengthwise of the vehicle as may be understood from Fig. 2. The lower edge 34 of the end gate 24 reaches down into close proximity with the bottom 33 as indicated in this figure, but in such manner that streams of liquid may flow down the corrugations and thus escape under the gate 24.

Disposed adjacent the end gate 24 is a trough 35 extending practically the full width of the vehicle. Two pipes 36 communicate with the ends of this trough and also with the tank 12. These pipes, when the parts are in normal position, as indicated in Fig. 1, slope gently downward at their ends toward the front portion of the wagon so as to discharge into the tank 12 any liquid material they may receive from the trough 35. The tank 12 is provided with holes 37 through which the pipes 36 extend and in which they have a slight turning or rocking movement. The trough 35 is supported upon swinging links 38, the latter being mounted upon pivot pins or bearings 39. The arrangement of these parts is such that when the end gate 24 is released from the latches 25, it swings downwardly as indicated by dotted lines in Fig. 1, and in this event the trough 35 goes downward until it is fairly under the lower rear end of the receptacle 23. By this arrangement the contents of this receptacle 23 may be discharged without disturbing the trough 35. At 40 (see Fig. 2) is shown a quantity of liquid within the trough 35. A quantity of manure is shown at 41 in the receptacle 23.

The operation of my device is as follows: The parts being assembled and arranged as indicated, and a quantity of manure 41 being placed within the receptacle 23, water is sprinkled or poured into this receptacle so as to thoroughly saturate the manure. The leakage from the manure issues in small streams from the corrugated bottom of the receptacle 23 and is discharged into the trough 35. It thence flows forwardly through the pipe 36 and is received at 21 in the tank 12. Then the operator, by means of the hand levers 20 and pitmen 19, opens the valves 17. This allows the lquid 21 to pass through the pipes 13 to the distributing pipe 14 and be discharged upon the soil.

As manure causes flies to gather in large quantities, the fly trap 11 is effective for catching these insects.

I do not limit myself to the particular mechanism herein shown, as variations may be made therein without departing from the spirit of my invention.

I claim:

1. A manure wagon comprising a tank for holding a liquid, mechanism for discharging said liquid from said tank under the control of the operator, a receptacle located above said tank and provided with a swinging end gate, a trough connected with the end gate of said receptacle for receiving leakage therefrom, and pipes extending from said trough into said tank for delivering said leakage into said tank, said pipes being mounted to swing on the tank.

2. A manure wagon comprising a tank, a receptacle located adjacent said tank and provided with a corrugated bottom to facilitate drainage and leakage of liquid from the manure carried within said receptacle, a trough disposed adjacent said receptacle for receiving therefrom said leakage, means for conveying said leakage from said trough into said tank, and means for discharging the contents of said tank.

3. A device of the character described comprising a receptacle provided with an end gate, means for coupling said end gate to swing open, links pivotally connected with said end gate, a trough carried by said links and adapted to receive leakage passing from said receptacle, pipes connected with said trough, a tank into which said pipes discharge, and mechanism controllable at the will of the operator for discharging the contents of said tank.

4. A manure wagon comprising a tank, distributing means connected with the tank, a manure receptacle above the tank and having an inclined bottom and provided with a hinged end gate, a trough pivotally connected with the end gate and receiving the leakage from the receptacle, and a pipe connection between the trough and the tank.

BARNEY VICK CORNELIUS.

Witnesses:
 JOE P. COWDEN,
 T. C. POWELL.

Copies of this patent may be obtained for five cents each, by addressing the "Commissioner of Patents, Washington, D. C."